(12) United States Patent
Parker

(10) Patent No.: US 10,516,815 B2
(45) Date of Patent: Dec. 24, 2019

(54) IMAGE PROCESSING SYSTEM

(71) Applicant: Northrop Grumman Systems Corporation, Falls Church, VA (US)

(72) Inventor: A. Dale Parker, Rancho Palos Verdes, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 919 days.

(21) Appl. No.: 14/556,878

(22) Filed: Dec. 1, 2014

(65) Prior Publication Data

US 2016/0156824 A1  Jun. 2, 2016

(51) Int. Cl.
| | | |
|---|---|---|
| *H04N 5/232* | (2006.01) | |
| *H04N 5/247* | (2006.01) | |
| *G08G 5/06* | (2006.01) | |
| *G08G 5/02* | (2006.01) | |
| *G01C 23/00* | (2006.01) | |
| *B64D 45/08* | (2006.01) | |
| *G08G 5/00* | (2006.01) | |

(Continued)

(52) U.S. Cl.
CPC ............. *H04N 5/232* (2013.01); *B64D 45/08* (2013.01); *G01C 23/00* (2013.01); *G01S 13/865* (2013.01); *G06T 3/4038* (2013.01); *G08G 5/0013* (2013.01); *G08G 5/0021* (2013.01); *G08G 5/0026* (2013.01); *G08G 5/025* (2013.01); *G08G 5/065* (2013.01); *H04N 5/23293* (2013.01); *H04N 5/247* (2013.01); *B64D 2011/0061* (2013.01); *G01S 2013/916* (2013.01)

(58) Field of Classification Search
CPC .... H04N 5/232; H04N 5/23293; H04N 5/247; B64D 45/08; B64F 1/18; G01C 23/00; G01S 13/865; G06T 3/4038; G08G 5/0013; G08G 5/0021; G08G 5/0026; G08G 5/025; G08G 5/065
See application file for complete search history.

(56) References Cited

U.S. PATENT DOCUMENTS

| | | |
|---|---|---|
| 6,359,583 B1 | 3/2002 | Shamee |
| 7,692,571 B2 | 4/2010 | Lovberg et al. |

(Continued)

FOREIGN PATENT DOCUMENTS

| | | |
|---|---|---|
| CN | 103287584 | 9/2013 |
| WO | 2011067713 | 6/2011 |

OTHER PUBLICATIONS

Korn, B. et al; Weather independent flight guidance: analysis of MMW radar images for approach and landing; Pattern Recognition, 2000. Proceedings, 15th International Conference on, vol. 1; p. 350-353; 2000; doi: 10.1109/ICPR.2000.905350.

(Continued)

*Primary Examiner* — Thai Q Tran
*Assistant Examiner* — Sunghyoun Park
(74) *Attorney, Agent, or Firm* — McCracken & Gillen LLC

(57) ABSTRACT

Higher-resolution imagery of an airport runway can be provided from the pilot's point of view. Pilot point of view images may be generated using images captured by higher-resolution ground-based cameras. The images from the ground-based cameras are fed to a point of view processor that generates the pilot point of view images using aircraft position information. The pilot point of view images are transmitted to a display on the aircraft.

20 Claims, 3 Drawing Sheets

(51) Int. Cl.
*G01S 13/86* (2006.01)
*G06T 3/40* (2006.01)
*G01S 13/91* (2006.01)
*B64D 11/00* (2006.01)

(56) References Cited

U.S. PATENT DOCUMENTS

| | | | | |
|---|---|---|---|---|
| 8,380,367 | B2 | 2/2013 | Schultz et al. | |
| 2001/0048763 | A1* | 12/2001 | Takatsuka | B60R 21/013 382/154 |
| 2002/0147544 | A1 | 10/2002 | Nicosia et al. | |
| 2003/0095182 | A1* | 5/2003 | Imoto | H04N 7/183 348/148 |
| 2003/0152892 | A1* | 8/2003 | Huang | F41G 3/2694 434/11 |
| 2006/0268110 | A1* | 11/2006 | Koike | G06T 5/50 348/159 |
| 2007/0051793 | A1* | 3/2007 | Katoh | H04N 1/32101 235/375 |
| 2010/0238161 | A1* | 9/2010 | Varga | G06T 19/006 345/419 |
| 2012/0257056 | A1* | 10/2012 | Otuka | G06T 1/0007 348/148 |
| 2014/0300743 | A1* | 10/2014 | Kumon | B60R 1/00 348/148 |
| 2016/0107572 | A1* | 4/2016 | Weller | B60R 1/00 348/36 |

OTHER PUBLICATIONS

Yu, Z. et al; Ground-based visual guidance in autonomous UAV landing; Proc. SPIE 9067, Sixth International Conference on Machine Vision (ICMV 2013); vol. 9067, 90671W; pp. 90671W-1 through 90671W-6, (Dec. 24, 2013); doi:10.1117/12.2052977; http://dx.doi.org/10.1117/12.2052977.

Hespel, L. et al; Performance evaluation of laser scanners through the atmosphere with adverse condition, Proc. SPIE 8186, Electro-Optical Remote Sensing, Photonic Technologies, and Applications V; vol. 8186, 818606; pp. 818606-1 through 818606-15; (Oct. 5, 2011); doi:10.1117/12.898010; http://dx.doi.org/10.1117/12.898010.

Miller, J. L. et al; Runway-based infrared sensor for enhanced vision of approaching aircraft; Proc. SPIE 4023, Enhanced and Synthetic Vision 2000, (Jun. 23, 2000); vol. 4023; pp. 154 through 160; doi:10.1117/12.389338; http://dx.doi.org/10.1117/12.389338.

Gulec, N. et al; Enhancement of vision systems based on runway detection by image processing techniques; Proc. SPIE 8360, Airborne Intelligence, Surveillance, Reconnaissance (ISR) Systems and Applications IX; vol. 8360; pp. 83600T-1 through 83600T-13; (May 1, 2012); doi:10.1117/12.923697; http://dx.doi.org/10.1117/12.923697.

Schmerwitx, S. et al; Stereo radar: reconstructing 3D data from 2D radar; Proc. SPIE 6957, Enhanced and Synthetic Vision 2008, vol. 6957; pp. 695704-1 through 695704-9; (Apr. 15, 2008); doi:10.1117/12.776875; http://dx.doi.org/10.1117/12.776875.

Pons, J.P. et al; Variational Sterovision and 3D Scene Flow Estimation with Statistical Similarity Measures; IEEE Computer Society; Proc. of the Ninth IEEE International Conference on Computer Vision (ICCV 2003); 2-Volume Set; 6 pages.

Miled, W. et al; A Variational Framework for Simultaneous Motion and Disparity Estimation in a Sequence of Stereo Images; Telecom Paris Tech, Signal and Image Processing Department; ICASSP 2009; pp. 741-744; 978-1-4244-2354-5/09; 2009 IEEE.

Vogel, C. et al; View-Consistent 3D Scene Flow Estimation over Multiple Frames; Proc. of the Springer ECCV, Lecture Notes in, Computer Science 2014; pp. 1-16; 2014 Springer.

Vaish, V. et al; Reconstructing Occluded Surfaces using Synthetic Apertures: Stereo, Focus and Robust Measures; Computer Vision and Pattern Recognition, 2006 IEEE Computer Society Conference on; vol. 2; 2006; pp. 2331-2338; DOI: 10.1109/CVPR.2006.244; ISSN: 1063-6919; ISBN: 0-7695-2597-0.

NASA Spinoff; A New Definition for Ground Control; Office of the Chief Technologist; Value for NASA, Benefits for the Nation NASA Spinoff; 1 page; Spinoff 2002; http://spinoff.nasa.gov/spinoff2002/ct_11.html.

* cited by examiner

IMAGE PROCESSING SYSTEM

TECHNICAL FIELD

The present invention relates to the field of imaging, more particularly to the field of multi-point of view imaging.

BACKGROUND

In the past, pilots of vehicles such as aircraft have relied on unaided vision, control tower commands, and radar for situational awareness such as relative position and velocity of nearby objects and vehicles. Objects detected by radar are projected on a planar screen from a "birds eye view" as seen from high above the vehicle. Some systems display images from visible-light vehicle-mounted cameras on a cockpit screen to assist the pilot in understanding his or her surroundings. These systems provide a fixed point of view (POV) based on camera location and have limited range in low light, dust, and/or foggy environments. Still other systems incorporate infrared (IR) cameras to augment visible-light cameras, but IR images have limited resolution. Visible-light and IR cameras are typically placed in or near the nose of an aircraft to better approximate the pilot's POV. This location limits the size and weight of such cameras, thereby limiting their performance.

In still some other systems, ground-based cameras provide images to the pilot. Unfortunately, these images are provided from the point of view of the camera taking the image and not from the point of view of the pilot. As a result, the pilot's mental workload is increased by requiring the pilot to imagine the aircraft's actual position while looking at an image generated from a point of view different than his own. This is particularly troublesome during landings when the pilot's workload is already heavy.

SUMMARY

An embodiment of the present invention provides relatively high-resolution imagery to a pilot from the pilot's own point of view. These pilot point of view (PPOV) images are generated from images captured by ground-based cameras which have higher resolution capability than vehicle-mounted cameras. The images from the ground-based cameras are fed to a point of view processor that creates a three dimensional virtual model of the scene and then generates the PPOV images using aircraft position information. The PPOV images are transmitted to the aircraft and displayed in the cockpit. It is also possible to transmit the generated PPOV images to a pilot located remotely from the aircraft for remotely operated aircraft applications. This is done in real-time or near real-time so that the pilot can see up-to-date higher-resolution images of items such as an airport runway or even obstructions on the runway. As a result, aircraft safety is improved by providing the pilot with higher-resolution images from his point of view and thereby reducing his mental workload during critical periods such as aircraft landing.

In yet another embodiment of this invention, information and images from ground-based cameras such as optical cameras, millimeter wave cameras, electronically scanned optical arrays, electronically scanned electromagnetic arrays such as imaging radars, and infrared cameras are used to provide images to the processor that generates images from the pilot's point of view. If multiple types of cameras are used, the pilot can be given a choice of images to view. For example, optical images, millimeter wave images or infrared images may be chosen. It is also possible to choose combinations of images or cycle through different types of images. Additionally, previously stored images may be fused with the real-time or near real-time PPOV images provided to the pilot.

In another embodiment of the present invention, a receiver on a vehicle receives images transmitted to the vehicle. The images are generated from a plurality of cameras or image capture devices where the images provided by the capture devices are processed using the vehicles known position to generate images from a vehicle operator's point of view. The generated images are in near real-time or real-time and are transmitted to a receiver on the vehicle for display within the vehicle.

In yet another embodiment, the vehicle may include an image selector which permits an operator or pilot to select different images to be shown on the display. The images are from the operator's point of view but may be generated from millimeter wave cameras, optical cameras, infrared cameras or other image capture devices as specified through the selector. In order to communicate the selector output to the processor that creates the operator or pilot point of view images, the vehicle may include a transmitter that communicates the selector output to the image generator.

In another embodiment of the present invention, the vehicle display is wearable by the operator or pilot. As a result, the position of the display changes as the operator moves. The transmitter transmits the position of the display to the point of view image processor so that the operator or pilot point of view image that is transmitted to the vehicle is updated to match the position of the wearable display.

In yet another embodiment, the present invention comprises a plurality of image capture devices, where each device captures a different view of a scene to create a plurality of different views; a receiver to obtain aircraft or vehicle position information; a point of view processor to create a pilot or vehicle operator point of view image based on the vehicle position information and the plurality of different views; and a transmitter to transmit the pilot or operator point of view image to the aircraft or vehicle.

In still another embodiment, the present invention provides a method comprising the steps of using a plurality of image capture devices to create a plurality of different views of a scene; receiving or obtaining aircraft or vehicle position information;

generating a pilot or vehicle operator point of view image based on the vehicle position information and the plurality of different views; and transmitting the point of view image to the aircraft or vehicle.

In another embodiment, the present invention comprises a display to display pilot or vehicle operator point of view images; a receiver to receive transmitted pilot point of view images; and a selector to select from a plurality of pilot or operator point of view images.

In yet another embodiment, the present invention provides a method comprising the steps of receiving in a vehicle, off vehicle transmitted vehicle operator point of view images; and displaying in the vehicle, received off vehicle transmitted vehicle operator point of view images.

In still another embodiment, the present invention provides a method comprising the steps of receiving in a vehicle, off vehicle transmitted images and image capture location information; generating an operator point of view image using vehicle position information and the off vehicle transmitted images and image capture location information; and displaying in the vehicle, the operator point of view image.

BRIEF DESCRIPTION OF THE DRAWINGS

The drawings are for the purpose of illustrating embodiments of the invention.

DETAILED DESCRIPTION

Figure 1:
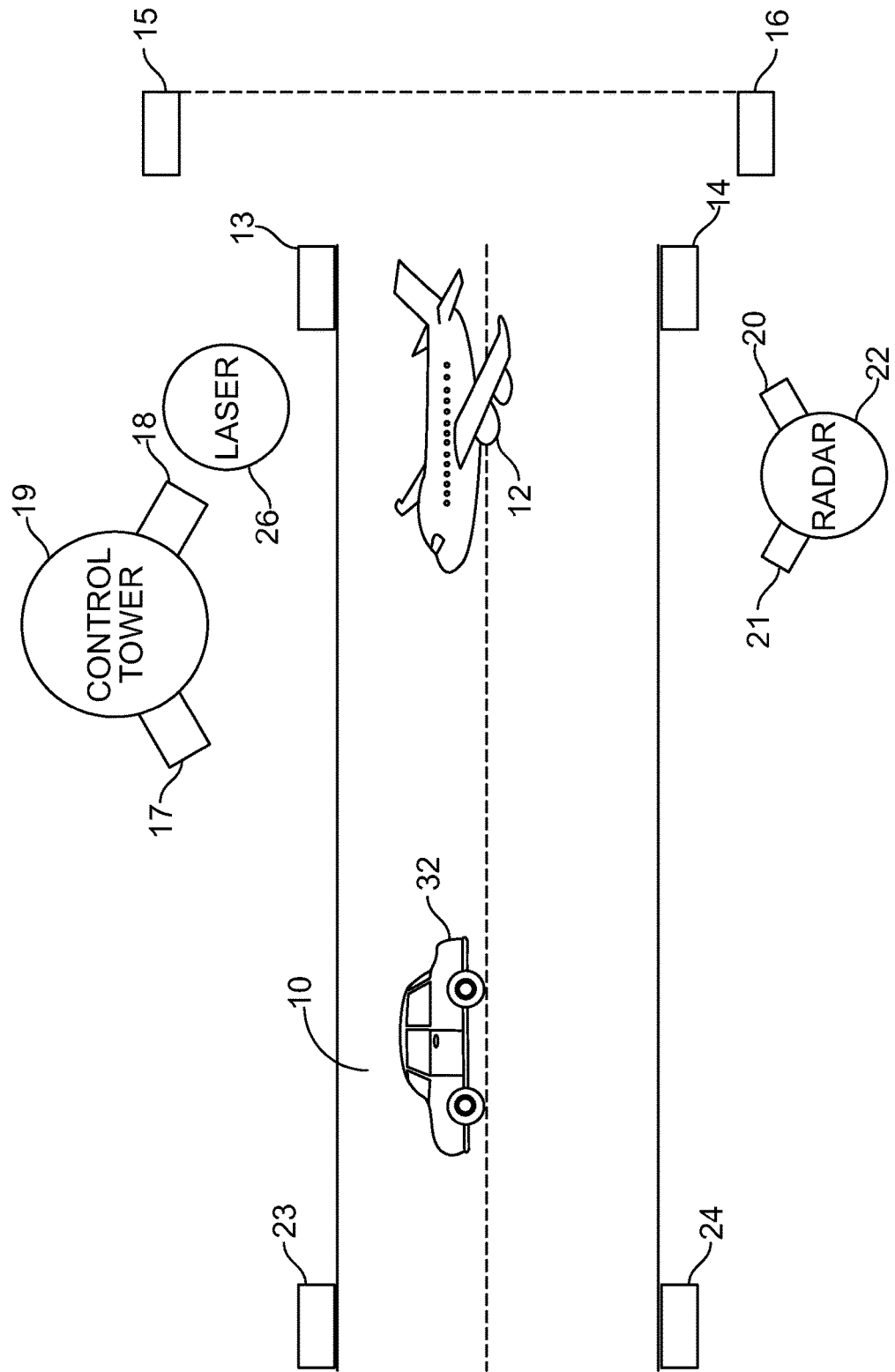
FIG. 1 illustrates an airport, aircraft and possible image capture device locations.

FIG. 1 illustrates an airport with runway 10 and aircraft 12 approaching for landing. Image capture devices 13 and 14 are located at the beginning of runway 10 and other image capture devices 15 and 16 are located at the airport boundary. Image capture devices may be located at many locations. For example, image capture devices 17 and 18 may be located on control tower 19, and image capture devices 20 and 21 may be located on radar tower 22. It is also possible to place image capture devices 23 and 24 on the sides of runway 10. The image capture devices may be optical cameras, millimeter wave cameras, infrared cameras or other types of image capture devices. The image capture devices may be devices that provide clearer images during periods where visibility is poor to the human eye. For example, millimeter wave image capture devices may provide clearer images under foggy conditions, and infrared image capture devices may provide clearer images when it is dark.

Aircraft 12's position is determined using aircraft mounted Global Positioning Satellite (GPS) systems, radar information from radar tower 22 and/or laser based information from laser and/or LADAR tower 26.

The image processing system receives captured images from image capture devices in real-time or near real-time. It also receives aircraft 12 position information in real-time or near real-time. The image processing system uses the captured images and the aircraft position information to generate a point of view image, that is, an image from the point of view of the pilot in aircraft 12 using the images captured from different points of view of runway 10. The generated PPOV images are transmitted to aircraft 12 to be displayed for pilot viewing. It is also possible to transmit the generated PPOV images to a pilot located remotely from the aircraft for remotely operated aircraft applications.

It is desirable to provide the generated PPOV images to aircraft 12 in real-time or near real-time. This is particularly important to avoid obstacles such as vehicle 32 that may be on runway 10. In some cases, stored images, such as images of an unobstructed runway on a clear day from different altitudes and distances from the runway, or specific features of the runway such as boundaries and centerlines, may be combined with the real-time or near-real-time images from the cameras and transmitted as PPOV images to enhance the information being provided to the pilot. Knowing the lag time from the moment an image is captured to the moment a processed image based on that captured image is displayed in the cockpit, along with the position, velocity and trajectory information of the plane 12 and object 32, allows the processor to predict the pilot's point of view at the moment of display and to create images from the pilot point of view corresponding to that moment at which the images are actually displayed.

It should be noted that the system may be used for other vehicles such as automobiles and boats. Image capture devices may be positioned on roads or in harbors where foggy conditions often occur. The images from the image capture device and vehicle position information can be used to provide real-time or near real-time images to a vehicle operator from the point of view of the vehicle operator notwithstanding that the image capture devices are located external to the vehicle.

Figure 2:
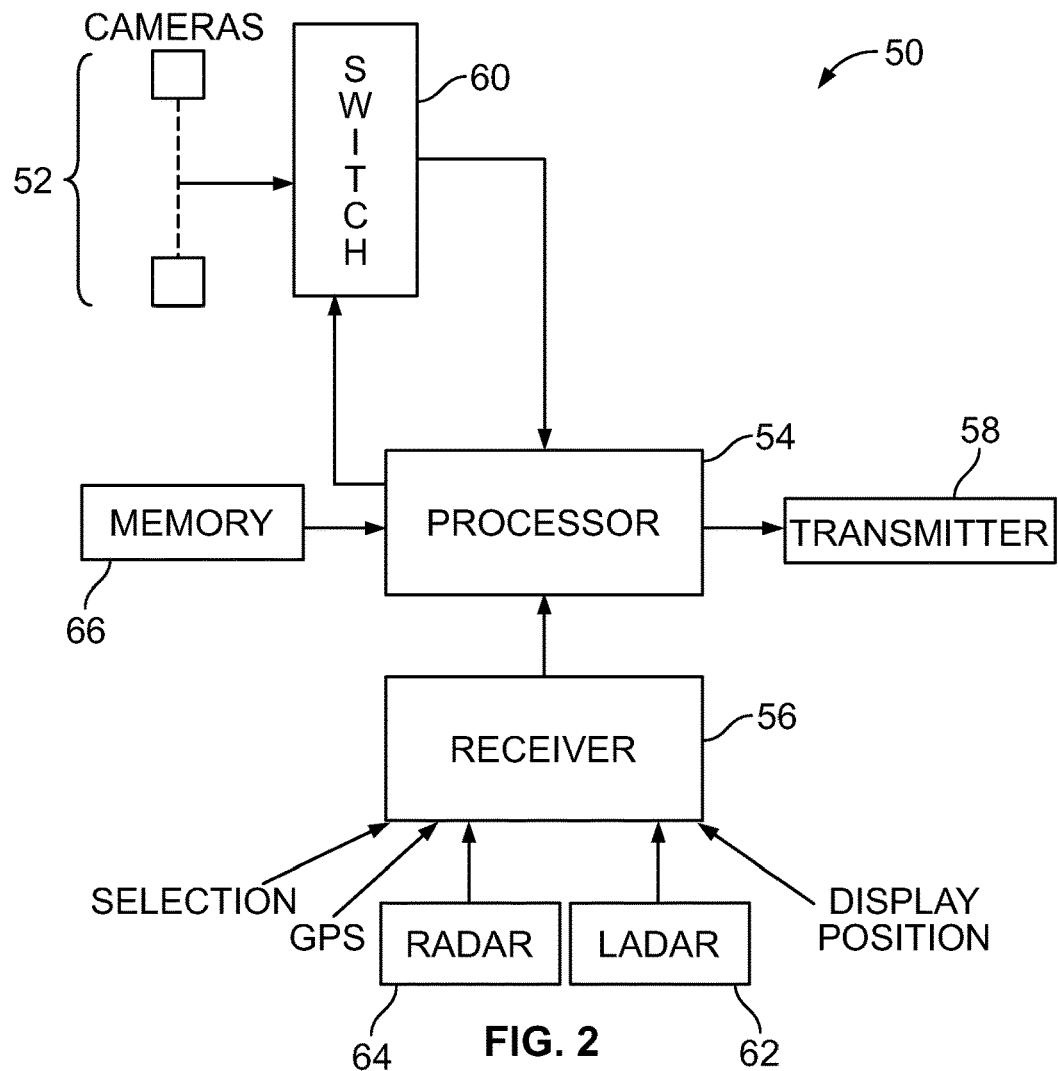
FIG. 2 illustrates a stationary or ground-based embodiment of the invention.

FIG. 2 illustrates an embodiment of the image processing system that is typically in a stationary location, however, the image processing system may be mobile in other embodiments. System 50 includes cameras 52, point of view processor 54, receiver 56 and transmitter 58. Transmitter 58 may be a radio signal transmitter, optical transmitter or circuitry designed to communicate data in electronic form. Cameras 52 may be image capture devices such as optical, millimeter or infrared cameras. The real-time or near real-time images from cameras 52 are provided to point of view processor 54. The images may be provided directly to processor 54 or they may be passed through switch or buffer 60 which can be used to select the image type or camera source for the images provided to processor 54. Processor 54 may control switch 60 based on received selection inputs. The selection inputs may be received through receiver 56 based on signals transmitted from a vehicle. Receiver 56 may be a radio receiver, optical receiver or circuitry designed to receive data in electronic form. Processor 54 also receives information such as vehicle GPS location information and display location information from the vehicle via receiver 56. Processor 54 may also receive vehicle location information from laser system 62 and/or radar system 64. Processor 54 uses the images from cameras 52 and the vehicle location information, to generate a vehicle operator or pilot point of view image of the scene captured by cameras 52.

Processor 54 may be fabricated using a computer, microprocessor, microcomputer, signal processor or other programmable hardware or combination of hardware and software. Processor 54 may generate the operator point of view images from the images provided by cameras 52 using algorithms such as stereoscopic algorithms of the type commonly used to create multipoint of view images of a scene based on separate images of the scene. For example, there are many virtual tour software packages that provide different points of view based on user input from a plurality of separate images of a scene, room or even an automobile.

Processor 54 may use images stored in memory 66 to enhance the point of view image transmitted to the vehicle. These may be clear weather optical images that are combined or fused with the point of view image provided to the vehicle or aircraft. Processor 54 may provide images to the vehicle based on only optical, only millimeter, only infrared cameras or it may provide the operator point of view images based on a combination of two or more types of camera inputs. It is also possible for processor 54 to provide operator point of view images in a cyclic fashion by cycling through each of the different type image capture devices.

Figure 3:
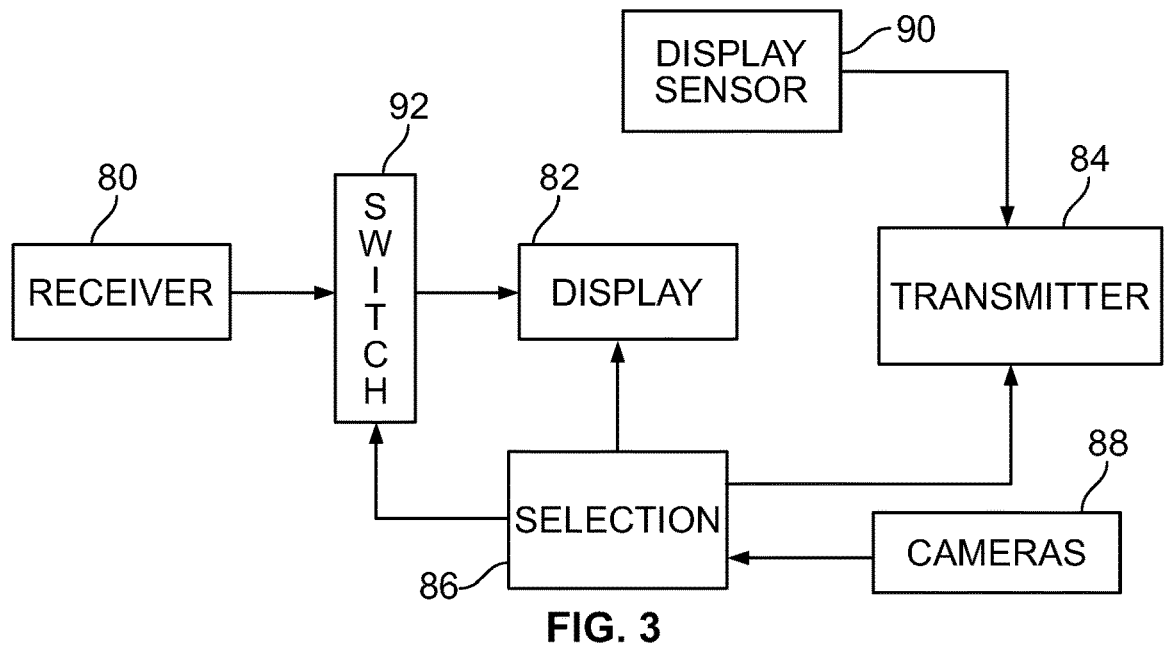
FIG. 3 illustrates an embodiment of the invention located in a vehicle.

FIG. 3 illustrates a vehicle mounted image display system. Receiver 80 receives operator point of view images transmitted by transmitter 58. Receiver 80 may be a radio receiver, optical receiver or circuitry designed to receive data in electronic form. The received operator point of view images can be displayed on vehicle display 82 to assist the vehicle operator with functions such as navigation. In order to assist processor 54 in generating the operator point of view images, transmitter 84 may provide the aircraft's or vehicle's position information to receiver 56. Transmitter 84 may be a radio signal transmitter, optical transmitter or circuitry designed to communicate data in electronic form.

The vehicle may also include display selector 86, which may be implemented in the form of a vehicle operator controlled switch. Selector 86 provides a way for the vehicle operator to request a particular type of image or combination of images. For example the operator may require infrared images, millimeter wave images or optical images or a combination thereof. The operator may also request that the different images are cycled or fused with a stored image. In order to provide these images, display selector 86 communicates the operator input to processor 54 through transmitter 84 and receiver 56. It should be noted that selector 86 may also be used to provide images from aircraft or vehicle mounted image capture device 88 for display on display 82.

Display 82 may also be implemented using a wearable display. In the case of a wearable display, display position sensor 90 generates and provides information regarding the wearable displays position to transmitter 84. This information is then transmitted to receiver 56 for use by processor 54 in generating the operator point of view image that is then transmitted to the aircraft.

In yet another embodiment, processor 54 provides operator point of view images for each of the camera type inputs that it receives. As a result, an operator point of view image is transmitted to the aircraft for each image type. For example the aircraft may receive an optical, millimeter and infrared operator point of view image separately. Display selector 86 may be used to control switch or buffer 92 to control which type operator point of view image is ultimately shown to the operator on display 82.

It should also be noted that the operator point of view images may also be generated as 3-D images for display on systems that support 3-D imagery.

Figure 4:
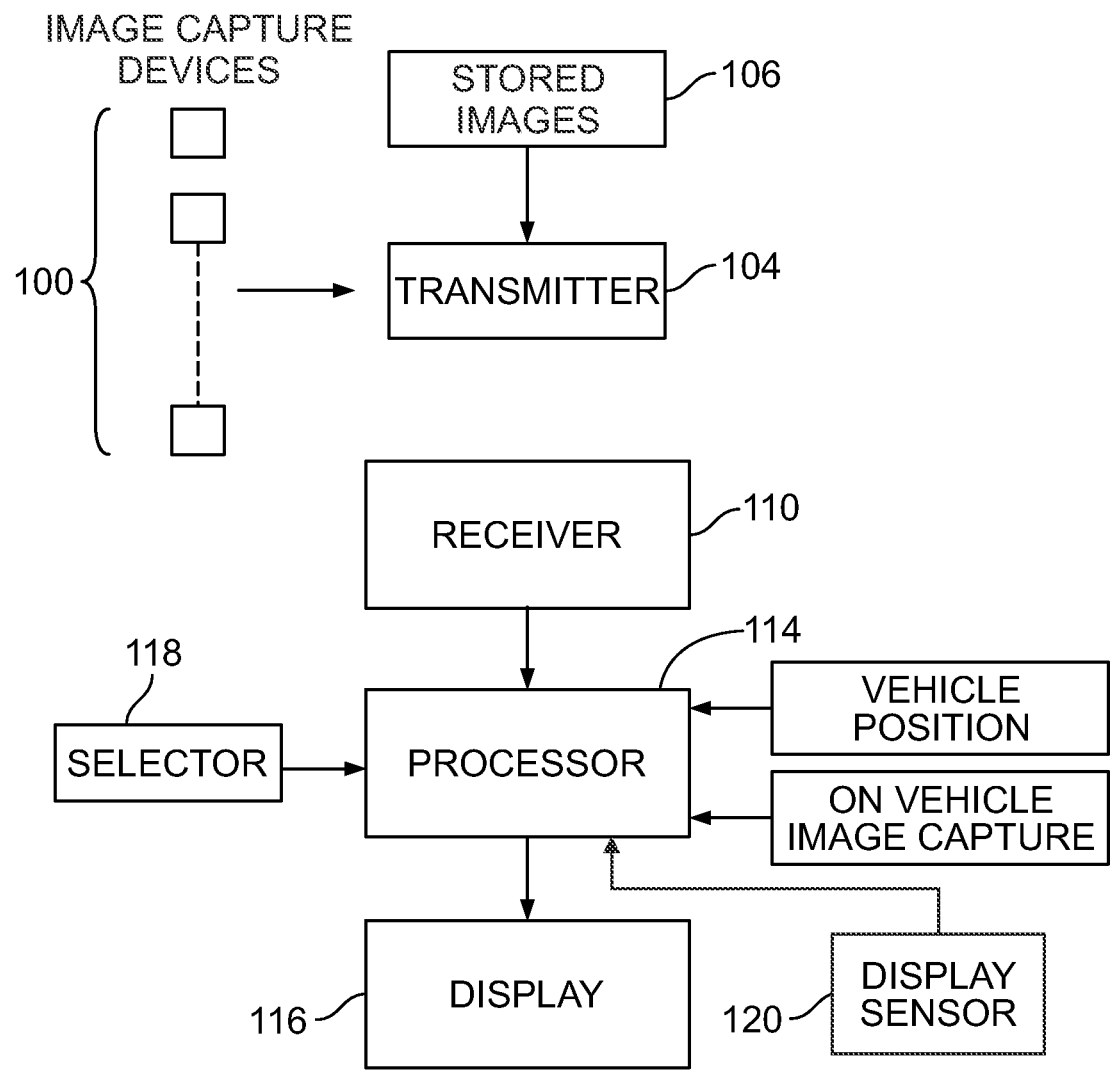
FIG. 4 illustrates another embodiment of the invention located in a vehicle.

FIG. 4 illustrates yet another embodiment of the present invention. In this embodiment, image capture devices similar to those of FIG. 1 are used to capture a plurality of different views. Image capture devices 100 may be located similarly to the image capture devices of FIG. 1. Image capture devices 100 may include a GPS receiver to determine image capture location information which may include information such as the location of each image capture device and it's direction of view. Image capture device information including captured images, GPS location and direction of view are provided to a transmitter 104. Each image capture device 100 may have a separate transmitter 104 or each image capture device may be in communication with transmitter 104. The image capture devices may be in communication with transmitter 104 via electrical conductor, optical link or wireless link. Additionally, it is also possible for image storage device 106 to provide images to transmitter 104. Stored images in image storage device 106 may include clear weather views of a runway or airport boundaries. Transmitter 104 communicates the captured images, image capture device location and direction of view to a vehicle mounted receiver. Additionally, transmitter 104 may communicate stored images and image information such as capture location and direction of view from storage image device 106 to the vehicle mounted receiver.

The transmissions from transmitter 104 are communicated to receiver 110 on an aircraft or vehicle. The aircraft or vehicle includes receiver 110, point of view processor 114, display 116 and selector 118. Receiver 110 provides the images, image capture device coordinates and direction of view information to processor 114. Processor 114 also receives vehicle position information to produce an operator or pilot point of view (PPOV) image. The vehicle position information may come from an on board GPS device. Processor 114 uses the received images, the image capture device coordinates, direction of view information and vehicle position information to generate a PPOV image. Processor 114 provides the PPOV image to display 116.

As discussed in prior embodiments, image capture devices may provide images captured using different parts of the electromagnetic spectrum. Selector 118 provides a switch for an operator to select between different types of images to be used by processor 114. Processor 114 may use the information from selector 118 to select which of the images from receiver 110 are be used to generate the PPOV image. Additionally, an on vehicle image capture device may provide an image to processor 114 for use in producing the PPOV image. The vehicle operator may use selector 118 to command processor 114 to make use of the image captured by the on vehicle image capture device.

Displaying 116 may be a wearable display and as a result the PPOV image may change based on the position of the display. Display sensor 120 provides display location information to processor 114 in order to produce a PPOV image that corresponds to the location of the display.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An imaging system, comprising:
   a plurality of image capture devices, each device capturing a different view to create a plurality of different views;
   a point of view processor to create a vehicle operator point of view image based on vehicle position information and the plurality of different views, wherein a least one of the plurality of different views is modified from an image capture device point of view to the vehicle operator point of view; and
   a transmitter to transmit the vehicle operator point of view image.

2. The imaging system of claim 1, where the image capture devices are optical cameras.

3. The imaging system of claim 1, where the image capture devices are millimeter wave cameras.

4. The imaging system of claim 1, where the image capture devices are infrared cameras.

5. The imaging system of claim 1, wherein the point of view processor creates the vehicle operator point of view image using image selection information.

6. The imaging system of claim 1, wherein the point of view processor creates the vehicle operator point of view image using display position information.

7. The imaging system of claim 1, wherein the point of view processor creates the vehicle operator point of view image using a stored image.

8. An imaging method, comprising the steps of:
   using a plurality of image capture devices to create a plurality of different views;
   obtaining vehicle position information; and
   generating a vehicle operator point of view image based on vehicle position information and the plurality of different views, wherein a least one of the plurality of different views is modified from an image capture device point of view to the vehicle operator point of view.

9. The method of claim 8, wherein the vehicle position information comprises radar information.

10. The method of claim 8, wherein the operator point of view image is generated using display position information.

11. The method of claim 8, the vehicle operator point of view image is generated using selection information.

12. An imaging method, comprising the steps of:
receiving in a vehicle, off vehicle transmitted vehicle operator point of view images, wherein a least one of the off vehicle transmitted vehicle operator point of view images is an image capture device point of view image modified to a vehicle operator point of view image; and
displaying in the vehicle, received off vehicle transmitted vehicle operator point of view images.

13. The method of claim 12, wherein the step of receiving comprises receiving a plurality of off vehicle transmitted vehicle operator point of view image types.

14. The method of claim 12, further comprising the step of transmitting an image type selection.

15. The method of claim 12, wherein the step of displaying comprises displaying a combination of received off vehicle transmitted vehicle operator point of view images and at least one image from an on vehicle image capture device.

16. The method of claim 12, further comprising the step of transmitting wearable display position information, and wherein the step of displaying comprises displaying on a wearable display.

17. An imaging method, comprising the steps of:
receiving in a vehicle, off vehicle transmitted images and image capture location information;
generating an operator point of view image using vehicle position information and the off vehicle transmitted images and image capture location information, wherein a least one of the off vehicle transmitted images is modified from an image capture device point of view to the operator point of view; and
displaying in the vehicle, the operator point of view image.

18. The method of claim 17, wherein the step of generating comprises using an image from an on vehicle image capture device.

19. The method of claim 17, further comprising the step of selecting a subset of the off vehicle transmitted images for use in generating the operator point of view image.

20. The method of claim 17, wherein the step of generating comprises using display location information.

* * * * *

UNITED STATES PATENT AND TRADEMARK OFFICE
CERTIFICATE OF CORRECTION

PATENT NO. : 10,516,815 B2  
APPLICATION NO. : 14/556878  
DATED : December 24, 2019  
INVENTOR(S) : A. Dale Parker Page 1 of 1

It is certified that error appears in the above-identified patent and that said Letters Patent is hereby corrected as shown below:

In the Claims

Column 7  
Line 9, please delete "a least" and insert --at least--.

Signed and Sealed this  
Eleventh Day of February, 2020

Andrei Iancu  
*Director of the United States Patent and Trademark Office*